United States Patent [19]

Rijnten et al.

[11] 3,872,028

[45] Mar. 18, 1975

[54] PROCESS FOR THE PREPARATION OF PARTIALLY SULFIDED METALLIC SUPPORTED CATALYSTS

[75] Inventors: Hendrik Theodorus Rijnten, Maasland; Eduard Theodoor Jasper Eikema, Den Brielle, both of Netherlands

[73] Assignee: Lever Brothers Company, New York, N.Y.

[22] Filed: Jan. 18, 1973

[21] Appl. No.: 324,726

[30] Foreign Application Priority Data
Jan. 20, 1972 United Kingdom............ 2839/72
July 28, 1972 United Kingdom........... 35356/72

[52] U.S. Cl............................ 252/439, 260/405.6
[51] Int. Cl............................................. B01j 11/74
[58] Field of Search................................... 252/439

[56] References Cited
UNITED STATES PATENTS
3,439,061  4/1969  Henderson et al.............. 252/439 X
3,527,839  9/1970  Glockner et al................. 252/439 X
3,686,137  8/1972  Gatti.............................. 252/439 X FOREIGN PATENTS OR APPLICATIONS
629,089  1/1963  Belgium............................. 252/439
6,403,451  1/1964  Netherlands...................... 252/439

Primary Examiner—Patrick P. Garvin
Assistant Examiner—Andrew H. Metz
Attorney, Agent, or Firm—Lever Brothers Company

[57] ABSTRACT

A process for preparing a partly sulphided metallic supported catalyst is described with especially uniform distribution of sulphur by contacting the catalyst either during or after precipitation with flowers of sulphur in aqueous medium at pH 7 to 11. The atomic ratio of sulphur to nickel at the surface of the nickel is preferably from 0.33 to 0.70 for hydrogenation of unsaturated fatty acid derivatives.

4 Claims, No Drawings

PROCESS FOR THE PREPARATION OF PARTIALLY SULFIDED METALLIC SUPPORTED CATALYSTS

The invention relates to a sulphided metallic supported catalyst.

Such catalysts have many uses; Charles L. Thomas, Catalytic Processes and Proven Catalysts, Academic Press, 1970 gives examples of such uses. Relevant metals include nickel, molybdenum, cobalt and tungsten. In particular sulphided nickel supported catalysts are of interest for the selective hydrogenation and for the isomerisation of unsaturated fatty acids and their derivatives, particularly triglycerides.

It has now been found that a metallic catalyst can advantageously be partly sulphided by contact with sulphur, preferably flowers of sulphur, in an aqueous system at a pH greater than 7. Preferably the final catalyst should contain 2 to 20 percent sulphur based on weight of metal.

It is believed that at low alkaline pH's, for instance pH 8, the following reactions are predominant:

$$4S + 6OH^- \rightleftharpoons 2S^{2-} + S_2O_3^{2-} + 3H_2O \quad (1)$$

$$M + S^{2-} \rightarrow MS \quad (2)$$

for example, $Ni(OH)_2 + S^{2-} \rightarrow NiS + 2OH^-$

Reaction (2) ensures that, even though the equilibrium position in reaction (1) is far to the left, reaction (1) nevertheless is forced to the right.

Additional sulphur can be provided by the addition of, for example, sodium or ammonium polysulphide at high, above 11, pH. After the addition of polysulphide, the pH can be lowered. The use of aqueous systems in the pH range 7 to 11 is particularly preferred. At higher pH's when polysulphide is added some metal polysulphide may be formed initially but almost certainly this reacts with excess metal to give the monosulphide.

It should be noted that the reactions are represented in a simplified manner. In particular M, the metal, will often be present as the hydroxide (preferably), oxide or carbonate or other salt and MS is not to be taken as implying that only monosulphide is formed; the actual compound will depend for instance on the particular metal. It will be appreciated that in most reactions the catalyst will be used in an activated state. Thus for hydrogenation reactions the catalyst will be reduced either in situ or in a previous step with hydrogen. In such reduction any sulphate or thiosulphate formed during the sulphidation or later will be reduced to sulphide. It has been found that for a catalyst according to the invention, particularly a nickel catalyst, the reduction should preferably be at between 350° and 500°C.

Most previously proposed methods of sulphiding leave unpredictable and irregular parts of the metallic catalyst unsulphided. This leads, for instance, to generally poor selectively characteristics as well as to unpredictable activity. A particular advantage of the invention is that the catalyst is sulphided very uniformly.

The metallic catalyst can for example, be sulphided on the support or the sulphidation can occur during formation of the metallic component, for instance by precipitation, on the support. Usually the metal is precipitated on the support-material to give a slurry of the metallic supported catalyst in the aqueous precipitation medium. Preferably the flowers of sulphur are added to this slurry. Preferably the precipitation and the sulphidation occur in different vessels. The slurry can be filtered and optionally washed and dried and resuspended in water before the flowers of sulphur are added but the process according to the invention has been found to be insensitive to the presence of other ions in the aqueous system. Non-dissolved sulphur is preferably maintained in suspension in the aqueous system.

The aqueous system during the contact should preferably be above 20°C, particularly preferably above 80°C, especially above 95°C. Higher temperatures can be used when higher pressures are used, for instance the conditions described in co-pending Belgian patent specifications 748742 and 748743. How long the sulphidation takes place is not important, except that in so far as the end-ratio of S to Ni is affected. Times of ¼h to 5h are convenient.

The metallic catalyst can be produced on the support by any convenient method, for instance as described in UK patent specification 1273743. Preferred techniques involve precipitating by means of a uniform and gradual change in the pH. Examples of such preferred processes are disclosed in UK patent specifications 926235, 991219, 1220105 and 1286555, Belgian patent specifications 748742 and 748743 and German patent specification 740,634.

Any convenient support material can be used. Examples include diatomaceous earths (e.g. kieselguhr), pumice, porcelain, silica, asbestos, alumina, charcoal, kaolin, other silicates, infusorial earth, magnesium and barium sulphates and magnesia. Typical surface areas of such carriers lie within the range of 4 to 1,000 sqm/g. Preferred support materials are synthetic silicas.

It has also been found that the atomic ratio of sulphur to metal at the surface of the metal should preferably be for nickel, at least for the hydrogenation of oils and fats, from 0.33 to 0.70, particularly preferably from 0.40 to 0.51 and optimally about 0.50. The amounts of ingredients to achieve these ratios can readily be determined, for instance experimentally. The ratio can be determined by measuring the sulphur and metal contents and the size of the metal crystallites, in the corresponding unsulphided catalyst, by hydrogen absorption (Ed. Linsen: Physical & Chemical Aspects of Absorbents and Catalysis, Academic Press, 1970) and assuming all the sulphur is on the surface of the metal. The benefits obtained from the atomic ratios of sulphur to nickel at the surface of the nickel are not tied specifically to the presently claimed process of sulphidation. It should also be noted that these benefits are particularly significant when the nickel is present on the support-material as crystallites that are evenly spaced and of uniform size. Such crystallites are obtained by preferred techniques of precipitation involving a uniform and gradual change in pH, see above.

All percentages and figures are by weight unless otherwise stated.

The invention will now be illustrated and described further by the following Examples.

EXAMPLE I

A suspension of 33 g of a macroporous silica with a specific surface of 292 m²/g in 1500 ml of a solution of 50 g nickel nitrate ($Ni(NO_3)_2 \cdot 6H_2O$), 130 g urea and 1.75 g flowers of sulphur was boiled for 5 hrs. The suspension was filtered hot and the precipitated cake was washed with 6 l water at 80°C. The cake was then dried for 16 hrs at 120°C and milled. The product contained about 20.7 percent Ni. After reduction under a flow of hydrogen at 450°C the product contained 8.6 percent S based on Ni.

EXAMPLE II

Example I was repeated except that 3 g flowers of sulphur were used. The nickel content was about 19.7 percent and the product contained 13.4 percent S based on Ni.

EXAMPLE III

A suspension of 33 g macroporous silica with a specific surface of 292 m²/g in 1500 ml of a solution of 50 g nickel nitrate ($Ni(NO_3)_2.6H_2O$) and 130 g urea was boiled for 4 hrs. The suspension was filtered hot and the green cake washed with 6 l water at 80°C.

The green cake was then resuspended in 1500 ml water and 2 g flowers of sulphur added to the suspension. The suspension was boiled for 2 hrs, then filtered, washed with 4 l water at 80°C and dried and activated as in Example I.

The nickel content was about 20 percent and, after activation, the product contained 10.8 percent S based on Ni.

EXAMPLE IV

Example III was repeated except that 1.75 g flowers of sulphur were used and guhr was used instead of the macroporous silica.

The nickel content was about 19 percent and, after activation, the product contained 7.9 percent S based on Ni.

EXAMPLE V 1.9 g flowers of sulphur and 180 g of a green cake, i.e. freshly precipitated catalyst, prepared according to co-pending U.K. patent specification 1273743 and containing 27 g nickel on German guhr were suspended in 1500 ml water. The suspension was boiled for 2 hrs and then treated as described in Example III. The nickel content was about 45 percent and, after activation, the product contained 6.2 percent S based on Ni.

EXAMPLE VI

Example I was repeated except that instead of the nickel nitrate 45 g nickel sulphate ($NiSO_4.6H_2O$) were used.

The nickel content was about 18.3 percent and, after activation, the product contained 11.7 percent S based on Ni.

EXAMPLE VII

Example III was repeated up to the washing with 6 l water at 80°C. The green cake was then resuspended in 1500 ml water. To the suspension 19.5 g of ammonium polysulphide solution containing between 8 and 9 percent sulphur was added. The suspension was brought to pH 8 with hydrochloric acid. The suspension was boiled for 2 hrs and then treated further as in Example III.

The nickel content was about 20 percent and, after activation, the product contained 8.9 percent S based on Ni.

EXAMPLE VIII

Green cake, i.e. freshly precipitated catalyst, prepared according to co-pending U.K. patent specification 1286555 and containing about 16 percent nickel on macroporous silica was suspended in 1500 ml water. Ammonia was added till pH8, 3.0 g flowers of sulphur and the process continued as described in Example III.

The nickel content was about 16 percent and, after activation, the product contained 17 percent S based on Ni.

EXAMPLE IX

Example VIII was repeated except that the catalyst was based on German guhr. The product contained, after activation, 14 percent S based on Ni.

EXAMPLE X

Example III was repeated except that the suspension was boiled for 3 hours.

The nickel content was about 22 percent and, after activation, the product contained 12.0 percent S based on Ni.

EXAMPLE XI

Example III was repeated except that the suspension was boiled for 1 hour.

The nickel content was about 20 percent and, after activation, the product contained 10.0 percent S based on Ni.

EXAMPLE XII

Example III was repeated except that $Co(NO_3)_2.6H_2O$ was used instead of $Ni(NO_3)_2.6H_2O$ and 1.75 g flowers of sulphur added instead of 2 g.

The cobalt content was about 20 percent and, after activation, the product contained 9.9 percent S based on Co.

Comparable results were obtained with other metallic supported catalysts, for instance catalysts containing iron, cobalt, cobalt and molybdenum, copper, cadmium and maganese. For details of the preparation of such catalysts see UK patent specifications 926235, 991219, 1220105 and 1286555 and Belgian patent specifications 748742 and 748743. Such catalysts have many uses as indicated by L. Thomas (see above). A pre-sulphided Co/Mb catalyst is particularly useful in the hydrodesulphurization of petroleum oils.

EXAMPLE XIII

Example I was repeated except that the catalyst was based on German guhr. The product contained about 19 percent nickel and, after activation, 8.7 percent S based on Ni.

EXAMPLE XIV

Example III was repeated except that the catalyst was based on German guhr. The product contained about 20 percent nickel and, after activation, 6.9 percent S based on Ni.

EXAMPLE XV

Example I was repeated except that the catalyst was based on German guhr. The product contained about 19 percent nickel and, after activation, 5.2 percent S based on Ni.

The above nickel catalysts are particularly useful in the selective hydrogenation and isomerization of triglyceride oils.

The atomic ratios of sulphur to nickel at the surface of the nickel for Examples 1, 3, 4, 6 and 7 were 0.42, 0.50, 0.39, 0.58 and 0.44 respectively.

What is claimed is:

1. A process for the preparation of a partly sulfided metallic supported catalyst containing from about 2 to about 20 percent sulfur based on metal in which process a metal selected from the group consisting of nickel, molybdenum, cobalt, tungsten, iron, copper, cadmium and manganese, its hydroxide, oxide or salt, during or after precipitation on a support, is partly sulfided by contact with flowers of sulfur suspended in water at a temperature above 80°C with a pH between 7 and 11.

2. A process as claimed in claim 1 in which the metal is precipitated as hydroxide, oxide or salt from aqueous solution on a support-material by gradual and uniform change in pH.

3. A process as claimed in claim 2 in which the aqueous solution contains urea and the pH is gradually and uniformly raised by heating the solution above 80°C.

4. A partly sulfided metal supported catalyst prepared by a process according to claim 1.

* * * * *